DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 9

T903,024

LIGHT-SENSITIVE POLYMERS CONTAINING THALLATED ARYL GROUPS

George A. Reynolds and Douglas G. Borden, both % Eastman Kodak Co., Kodak Park, Rochester, N.Y. 14650

Filed Feb. 18, 1972, Ser. No. 227,643
**Int. Cl. G03c *1/68***
U.S. Cl. 96—115 R
No Drawing. 9 Pages Specification

Light-sensitive polymers containing thallated aryl groups are prepared by reacting a preformed polymer containing aryl groups with a thallating agent. Suitable preformed polymers can have the aryl groups pendant from or as an integral part of the polymer backbone and include nonlight-sensitive polymers such as polystyrenes and polyphenyl ether and light-sensitive polymers such as poly(vinyl cinnamate) and poly(vinylnaphthophenone). Suitable thallating agents include thallium trifluoroacetate. Polymers of this invention are positive-working, i.e. on exposure to actinic radiation they become more soluble in typical developer solvent, and can be used in compositions and elements to prepare photomechanical images such as photoresists and planographic printing plates.